Figure 1:
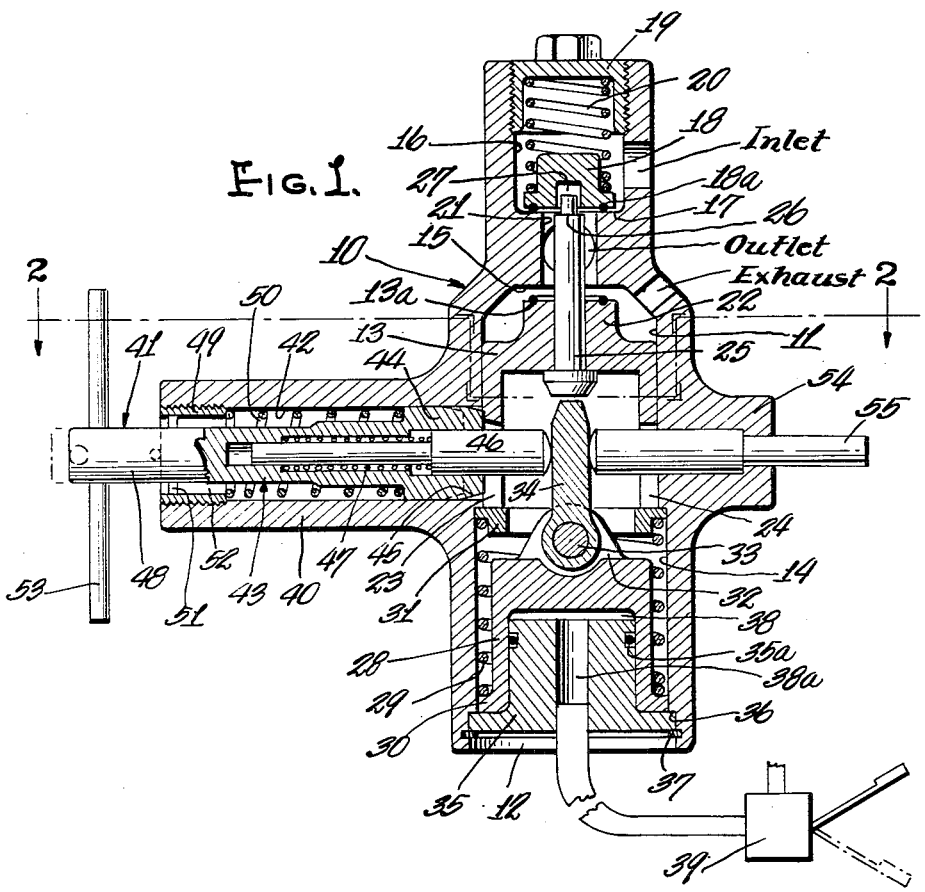

Sept. 4, 1956 R. SOMAN 2,761,426
FLUID CONTROL APPARATUS
Filed Aug. 12, 1952 2 Sheets-Sheet 1

INVENTOR.
ROBERT SOMAN
BY
ATTORNEY

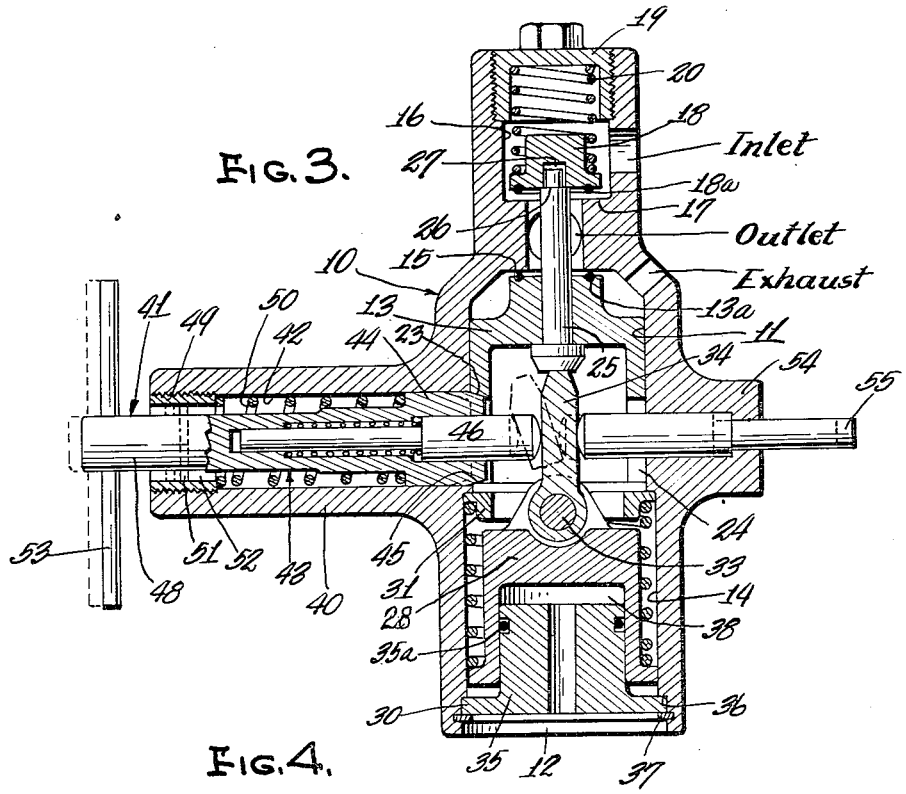
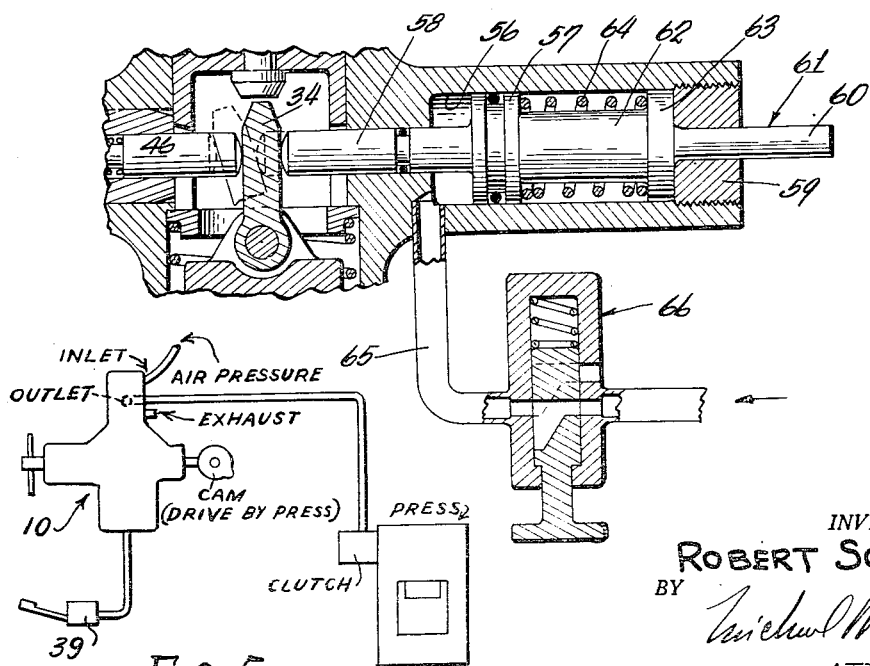

United States Patent Office 2,761,426
Patented Sept. 4, 1956

2,761,426

FLUID CONTROL APPARATUS

Robert Soman, Warren, Ohio, assignor to The Federal Machine and Welder Company, Warren, Ohio, a corporation of Ohio Application August 12, 1952, Serial No. 303,853

10 Claims. (Cl. 121—38)

My invention relates to apparatus for controlling fluid flow, more particularly to valve apparatus for controlling operation of a press and the like, and the principal object of my invention is to provide new and improved apparatus of the type described.

In the past, users of presses and like devices have found it advisable to provide control apparatus which effects one-stroke, non-repeat operation of the press. In such constructions, the press will automatically stop at the completion of one cycle regardless of the position of the operating control. In order to initiate another cycle, it is necessary to first move the operating control to "off" before once again shifting it to "on."

Figure 2:
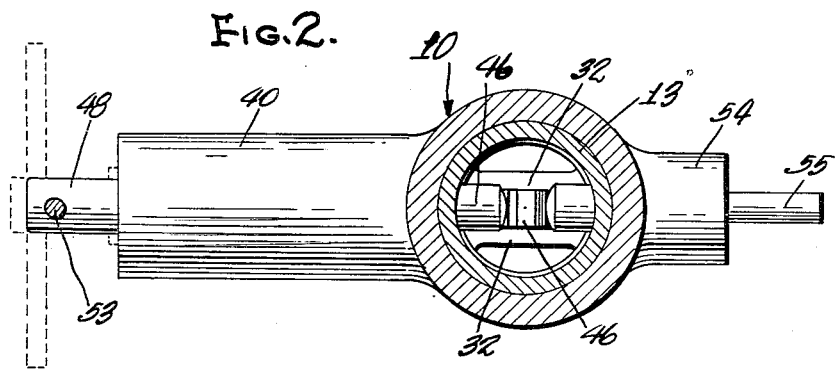

The aforementioned prior art controls have been largely electrical and although they operate fairly satisfactorily, their initial cost is very high and their maintenance is expensive and troublesome. In contrast, my invention provides troublefree apparatus which will effect one-stroke, non-repeat operation of any fluid operated or fluid controlled press or like machine. The apparatus provided by my invention may be manufactured at but a fraction of the cost of the prior art controls and my improved apparatus may be easily maintained or repaired by any semi-skilled mechanic. These and other advantages will become apparent from a study of the detailed description which follows:

In the drawings accompanying this specification and forming a part of this application there are shown, for purpose of illustration, two embodiments which my invention may assume, and in these drawings:

Figure 1 is a sectional view illustrating a preferred embodiment of my invention, certain parts being shown in an alternative position by dot-dash lines, Figure 2 is a sectional view generally corresponding to the line 2—2 of Figure 1, Figure 3 is a view similar to Figure 1 but showing various parts in another position, Figure 4 is a fragmentary view similar to Figure 1 but illustrating another embodiment of my invention, and Figure 5 is a diagramatic view illustrating my invention in use with a conventional mechanical press having a fluid actuated clutch.

As shown in the drawings, the apparatus illustrating my invention comprises an elongated body 10 having a bore 11 extending inwardly from one end 12 thereof. The bore 11 is adapted to slideably receive a valve member 13 and the bore is enlarged at 14 for a purpose to appear. The bore 11 terminates in a transversely disposed wall 15 and this wall provides a seat for the valve member 13.

The end of the body 10 opposite the end 12 provides a bore 16 that is co-axial with the bore 11, bore 16 terminating in a valve seat 17 that is spaced from valve seat 15 as shown. A valve member 18, having a sealing ring 18a, is contained within the bore 16, a cap 19 being threadably secured within the bore to close the open end thereof. A spring 20 is presently interposed between the cap 19 and the valve member 18 to yieldably hold the valve member against its seat 17.

As illustrated, a passage 21 extends between the valve seats 15, 16, and an outlet passage intersects the passage 21 and may be connected to the press or like device which my apparatus is adapted to control. An inlet passage communicates with the bore 16 and is adapted to be connected to a source of fluid pressure, such as an air line, and an exhaust passage communicates with the bore 11 and is presently vented to the atmosphere.

Referring once again to the valve member 13, it will be seen that this valve comprises a generally cup-shaped member having an axially extending, reduced diameter portion 22 which carries a sealing ring 13a. The skirt of the valve 13 provides opposed slots 23, 24 which extend inwardly from the lower edge of the valve, the purpose of these slots appearing later.

Action of the valves 13, 18 is presently correlated by means of a headed pin 25 which is press-fitted or otherwise rigidly secured to the valve 13. The pin is shouldered at 26 and the reduced-diameter end portion is receivable within a recess 27 in the valve 18.

In the present embodiment, a cup-shaped piston 28 is slideable within the enlarged bore 14 and the piston is yieldably urged downwardly, with respect to disposition of the parts shown in the drawings, by means of a spring 29 which has one end thereof seated against a flange 30 provided by the piston and which has its other end thereof seated against a flanged washer 31. The head of the piston provides a pair of spaced-apart, upstanding lugs 32 which are apertured to receive respective ends of a pin 33, a tongue 34 being pivotally carried by the pin 33 between respective lugs 32 for a purpose to be shown.

A flanged plug 35 is seated against a shoulder 36 in the body 10 and the plug is presently secured in place by means of a snap-ring 37. The main body of the plug is slideably receivable within the interior 38 of the piston 28, and a sealing ring 35a is carried by the plug to prevent fluid leakage therebetween. A passage 38a is provided in the plug 35, as shown, and such passage may be connected by suitable conduit to a conventional foot pedal or otherwise operated valve 39 which is adapted to be connected to a source of fluid pressure. This valve has not been shown in detail since it may be of any conventional type and in itself forms no part of this invention. It is to be understood, however, that the valve 39 has an "on" position wherein fluid may flow from the source of pressure to the interior of the piston 28, and an "off" position wherein fluid pressure in the interior of the piston 28 may be exhausted.

Although not shown in the drawings, it will be apparent that the piston 28 could be directly connected to a mechanical linkage which would effect movement thereof instead of utilizing fluid pressure to shift the piston.

As shown in Figures 1, 2 and 3, the body 10 is formed with a tubular, lateral extension 40 for receiving latch means 41. The extension 40 provides a bore 42 in which a sleeve 43 is slideable. The sleeve 43 has an enlarged head portion 44 which is tapered at 45, as shown, and the sleeve is counterbored to slideably receive a stepped diameter pin 46 which is spring-pressed to the right, as viewed in the drawings, by means of a spring 47.

The shank 48 of the sleeve 43 extends outwardly of the extension 40 and is slideable within a plug 49 threaded into the extension. A spring 50 is interposed between the plug 49 and the head 44 of the sleeve 43 to urge the sleeve to the right, and a pin 51 is transversely secured in the shank 48 as shown. A slot 52 is provided in the plug 49 to permit axial movement of the sleeve 43, and a T handle 53 is carried by the shank 48 for a purpose to be described.

As seen in the drawings, an extension 54 is formed on the body 10 in diametrically opposed relation with respect to extension 40, and in the embodiment shown in Figures 1, 2 and 3, the extension 54 is adapted to slideably receive a stepped diameter release pin 55.

The operation of the embodiment illustrated in Figures 1, 2 and 3 may now be described, it being recalled that the outlet passage of my apparatus is adapted to be connected to a press or the like and it being understood that such press may be of the mechanical type having a fluid controlled clutch or of the conventional fluid operated type.

My apparatus is shown in Figure 1 in its initial position wherein valve 18 closes the inlet from the outlet and wherein the outlet communicates with the exhaust or atmosphere. In this position of parts, the operating valve 39 is in its "off" position and the press controlled by my apparatus is at rest.

When it is desired to initiate a press cycle it is only necessary to move the operating valve 39 from "off" to "on" position. Fluid under pressure will then cause piston 28 to move upwardly to the position shown in Figure 3. This upward movement of the piston will be transmitted to the correlated valves 13, 18 through the tongue 34, the valve 13 breaking communication between the outlet and the exhaust and the valve 18 establishing communication between the inlet and the outlet to effect operation of the press.

As the valve 13 approaches its uppermost position, the tapered head 44 of the sleeve 43 will be urged by the spring 50 to enter in the slot 23 of the valve. This will hold valves 13 and 18 in the position shown in Figure 3 so that operation of the press will continue even though the pedal valve 39 is released.

Release of the latch mechanism 41 at the conclusion of one cycle of operation of the press is accomplished as follows: Means (not shown), such as a cam or the like, may be secured to the press in manner so that the release pin 55 will be momentarily shifted to the left upon completion of the cycle. As shown by dot-dash lines in Figure 3, such movement will effect pivotal movement of the tongue 34, and movement of the tongue will shift pin 46 and thus cause sleeve 43 to return to its original position disengaged from slot 23 of valve 13.

As will be clear, disengagement of sleeve 43 from valve 13 and the shifting of tongue 34 from its vertical position will permit valves 13 and 18 to return to their initial positions shown in Figure 1 whereby the press will again become inactive. It will also be clear that the foregoing release operation will take place regardless of whether the piston 28 remains elevated as shown in Figure 3 by continued pressure from the pedal valve 39, or whether the piston is in its lowermost position because of a release of pressure by pedal valve 39.

Assuming that the operator has allowed pedal valve 39 to return to "off" position before the press cycle is completed, tongue 34 will be returned to its vertical position by pin 46 and spring 47 immediately after the release operation. However, if the operator continues to hold pedal valve 39 in the "on" position, piston 28 will remain elevated and tongue 34 will be unable to return to its vertical position after valve 13 has moved down because tongue 34 will then become engaged with the side of the head of pin 25. In order to permit tongue 34 to return to its vertical position so that another cycle may be initiated, it will be necessary for the operator to first return pedal valve 39 to "off" position.

In the event the operator desires to maintain operation of the press under control of the pedal valve 39, as for example during die try-out operations, the latch mechanism 41 may be rendered inoperative by moving the sleeve 43 to the left until the transverse pin 51 is withdrawn from its slot 52 and the T handle then rotated 90 degrees to the dot-dash position shown in Figure 1. In this position the sleeve will be unable to engage the valve slot 23 and thus movement of the press will be under control of the pedal valve 39. If desired, the cam mechanism which trips the pin 55 may also be disengaged so that the press is under complete control of the pedal valve.

Figure 4 illustrates a modified form of my invention which embodies an emergency stop in the event it is desired to immediately halt operation of the press after the cycle has been initiated. In this form of the invention the extension 54 is modified to provide a cylinder 56 in which a piston 57 is reciprocable. A piston rod 58 extends from the piston 57 and engages with the tongue 34 in the manner similar to release pin 55.

A plug 59 is threaded into the end of the cylinder 56 and is apertured to slideably receive the shank 60 of a release pin 61. Release pin 61 has an enlarged shank portion 62 which is shown in abutting relation with piston 57 and an intermediate collar portion 63. A spring 64 is interposed between the collar portion 63 and the piston 57 and such spring urges the piston to the left so that the piston rod 58 holds the tongue 34 in the dot-dash position shown.

In normal operation and when sufficient fluid pressure exists, the piston 57 will be held against the urging of spring 64 in the full-line position shown by means of fluid pressure in the cylinder 56 that is admitted through conduit 65 and valve 66. Shank 60 is adapted to be engaged by a cam or the like in the manner described heretofore, and tripping of the latch mechanism 41 at the completion of a press cycle will be similarly accomplished through pin 61, piston 57 and rod 58, tongue 34 and pin 46.

In the event the operator desires to stop the press after starting its cycle and before its completion, it is only necessary to momentarily press the emergency stop button on valve 66. As will be clear, pressing the stop button will shift the parts of the valve so that the fluid pressure holding piston 57 in the position shown will be vented to the atmosphere. This will permit spring 64 to shift the piston and piston rod 58 to the dot-dash position shown thus shifting tongue 34, releasing the latch mechanism 41, and causing the press to stop.

In view of the foregoing it will be apparent to those skilled in the art that I have accomplished at least the principal object of my invention and it will also be apparent to those skilled in the art that the embodiments herein described may be variously changed and modified, without departing from the spirit of the invention, and that the invention is capable of uses and has advantages not herein specifically described, hence it will be appreciated that the herein disclosed embodiments are illustrative only, and that my invention is not limited thereto.

I claim:

1. Apparatus for controlling fluid flow comprising body means having a plurality of ports, valve means carried by said body means and movable to and from port covering relation, shiftable means engageable with said valve means for effecting movement thereof, latch means engageable with said valve means for releasably holding said valve means in one position, and release means operable to effect disengagement of said latch means and said shiftable means from said valve means.

2. Apparatus for controlling fluid flow comprising body means having a plurality of ports, valve means carried by said body means and movable to and from port covering relation, said valve means being yieldably urged to one position, shiftable means engageable with said valve means for effecting movement thereof from said one position to another position, latch means engageable with said valve means for releasably holding said valve means in said other position, and release means operable to effect disengagement of said latch means and said shiftable means from said valve means to provide for return of said valve means to said one position.

3. Apparatus for controlling fluid flow comprising body means having an inlet port, an outlet port and an exhaust port, valve means carried by said body means and movable with respect thereto so that in one position of said valve means said outlet port communicates with said exhaust port and in another position of said valve means said inlet port communicates with said outlet port, said valve means normally being yieldably urged to said one position, shiftable means engageable with said valve means for effecting movement thereof from said one position to said other position, latch means engageable with said valve means for releasably holding said valve means in said other position, and release means operable to effect disengagement of said latch means and said shiftable means from said valve means to provide for return of said valve means to said one position.

4. Apparatus for controlling fluid flow comprising body means having a plurality of ports, valve means carried by said body means and movable to and from port covering relation, said valve means being yieldably urged to one position, piston means for moving said valve means from said one position to another position, shiftable means pivotally secured to said piston means and being movable therewith and engageable with said valve means to effect movement thereof, latch means engageable with said shiftable means and with said valve means for releasably holding said valve means in said other position, and release means engageable with said shiftable means and operable to effect pivotal movement of said shiftable means and thereby to effect disengagement of said latch means and said shiftable means from said valve means to provide for return of said valve means to said one position.

5. Apparatus for controlling fluid flow to a press and like devices comprising body means having a plurality of ports, valve means carried by said body means and movable to and from port covering relation, said valve means being yieldably urged to one position wherein the device controlled by said apparatus is inoperative, shiftable means engageable with said valve means for effecting movement thereof from said one position to another position whereby the device controlled by said apparatus is operative, latch means engageable with said valve means for releasably holding said valve means in said other position, and release means operable at a preselected time to effect disengagement of said latch means and said shiftable means from said valve means to provide for return of said valve means to said one position and to thus interrupt operation of the device controlled by said apparatus.

6. Apparatus for controlling fluid flow to a press and like devices and providing for one-stroke, non-repeat operation thereof comprising body means having a plurality of ports, valve means carried by said body means and movable to and from port covering relation, said valve means being yieldably urged to one position wherein the device controlled by said apparatus is inoperative, piston means for moving said valve means from said one position to another position whereby the device controlled by said apparatus is operative, shiftable means pivotally secured to said piston means and being movable therewith and engageable with said valve means to effect movement thereof, latch means engageable with said shiftable means and with said valve means for releasably holding said valve means in said other position, and release means engageable with said shiftable means and operable at the conclusion of one cycle of the device to effect pivotal movement of said shiftable means and thereby effect disengagement of said shiftable means from said valve means to provide for return of said valve means to said one position and to thus interrupt operation of the device controlled by said apparatus.

7. Apparatus for controlling fluid flow to a press and like devices and providing for one-stroke, non-repeat operation thereof comprising body means having a plurality of ports, valve means carried by said body means and movable to and from port covering relation, said valve means being yieldably urged to one position wherein the device controlled by said apparatus is inoperative, shiftable means engageable with said valve means for effecting movement thereof from said one position to another position whereby the device controlled by said apparatus is operative, latch means engageable with said valve means for releasably holding said valve means in said other position, release means operable at the conclusion of one cycle of the device to effect disengagement of said latch means and said shiftable means from said valve means to provide for return of said valve means to said one position and to thus interrupt operation of the device controlled by said apparatus, and safety means for interrupting operation of the device controlled by said apparatus, said safety means being operable at any portion of the cycle to immediately effect operation of said release means.

8. Apparatus for controlling fluid flow, comprising body means having a port through which fluid is adapted to pass, valve means carried by said body means and movable to and from port covering relation and being yieldably urged to one position relative to said port, slidable means spaced from said valve means and adapted to move the latter from said one position to another position, shiftable means extending between said valve means and said slideable means and pivotally secured to the latter and movable therewith to effect movement of said valve means, latch means engageable with said valve means for releasably holding the latter in said other position, first resilient means yieldably urging said latch means to engagement with said valve means, abutment means carried by said latch means and engageable with said shiftable means, second resilient means yieldably urging said abutment means to engagement with said shiftable means, and release means engageable with said shiftable means and operable to effect pivotal movement thereof against the urging of said second resilient means and also movement of said latch means against the urging of said first resilient means to thereby effect disengagement of said shiftable means and said latch means from said valve means to provide for return of the latter to said one position.

9. The apparatus as specified in claim 1 and further including means selectively operable to maintain said latch means out of engagement with said valve means.

10. The apparatus as specified in claim 1 and further including means for automatically moving said latch means to latching engagement with said valve means when the latter has been moved to said one position.

References Cited in the file of this patent

UNITED STATES PATENTS

| | | |
|---|---|---|
| 1,156,855 | Akans | Oct. 12, 1915 |
| 1,336,171 | Trace | Apr. 6, 1920 |
| 1,595,755 | Brooks | Aug. 10, 1926 |
| 2,246,379 | Muir | June 17, 1941 |
| 2,433,719 | Sittert | Dec. 30, 1947 |
| 2,451,559 | Kirby | Oct. 19, 1948 |
| 2,572,195 | Proctor | Oct. 23, 1951 |
| 2,599,781 | Rhodes | June 10, 1952 |

FOREIGN PATENTS

| | | |
|---|---|---|
| 407,243 | Italy | Sept. 25, 1944 |